Patented July 19, 1932

1,867,946

UNITED STATES PATENT OFFICE

HENRY BROUGHAM HUTCHINSON, OF HARPENDEN, ENGLAND

PRODUCTION OF ALIPHATIC ACIDS BY FERMENTATION

No Drawing. Application filed September 15, 1930, Serial No. 482,163, and in Great Britain September 30, 1929.

The present invention relates to the production of volatile fatty acids, particularly acetic acid, from sugar solutions by fermentation with thermophilic organisms.

It has been found that when a sugar solution, e. g., a molasses mash, is inoculated with thermophilic organisms such as, for example, organisms which ferment cellulose with the production of fatty acids, only small amounts of acetic acid are produced unless the concentration of sugar is extremely low. With the concentrations of sugar used normally in fermentation processes non-volatile acids with only small amounts of acetic acid are formed and as the concentration of sugar is reduced so the yield of volatile acid, particularly acetic acid, increases, until, when the mash contains very low concentrations of sugars practically all the acid produced is volatile acid. It would not however be practicable by normal fermentation to produce acetic acid in an economic manner from the very weak solutions of sugars, e. g. 0.5 to 1.0% that would be necessary to ensure the non-production of non-volatile acids, as the volatile acid resulting from such fermentation would be too low in concentration to be recovered economically.

A suitable culture of organisms for my process may be obtained from animal excrements or from decomposing cellulosic material. The organisms used in my process are characterized, firstly, by their capacity to decompose and ferment cellulose in the entire absence of other sources of carbon nutrient, secondly by the very high optimum temperature of their growth (a suitable temperature for carrying out my process being from 60–65° C.) and thirdly, by the formation of terminal spores which render them resistant to temperatures of 100° C. or over for short periods. In this latter respect, and by the marked production of volatile fatty acids, my organisms are differentiated from Bacillus Delbruckii and related non-spore-forming bacteria.

According to the present invention sugar solutions are added intermittently or continuously to a culture of the thermophilic organisms in a dilute sugar solution at such a rate that the sugar concentration never rises to the level at which an accumulation of non-volatile acids takes place.

The hydrogen ion concentration of the fermenting liquid is maintained at an optimum point for the organisms employed by the periodic or continuous addition of alkalis, such as sodium bicarbonate, ammonia, lime water, calcium carbonate and the like.

Where necessary, nutrients such as ammonia, ammonium sulphate, ammonium phosphate, etc., may be added to the fermenting liquid and, if desired, these may be added simultaneously with the sugar solution. In this way an economic concentration of salts of fatty acids, particularly of acetic acid, can be obtained, from which the acid can be recovered by any known means.

The fermentation may be carried out in a continuous manner and fermented wash may be withdrawn intermittently or continuously in such a way that any desired concentration of fatty acid salt in the mash may be maintained.

As sugar solutions there may be used diluted molasses from cane or beet sugar manufacture, sugar solutions obtained from crude sucrose, glucose solutions, sugar solutions obtained from sorghum, carob beans and other plant products containing sugar, sugar solutions obtained from the hydrolysis of cellulose and cellulose-containing materials such as those obtained by treating sawdust with acid, or those obtained in the sulphite treatment of wood to obtain cellulose pulp, or sugar solutions obtained from the hydrolysis of starch and starch-containing materials.

On a commercial scale it would not be practicable to establish in a fermenter a wash of the necessarily low sugar concentration and then withdraw portions and add equivalent portions of fresh sugar solution of the same sugar concentration owing to the low percentage of volatile fatty acid salt in the withdrawn portions and the consequent expense of concentration for recovery. On the other hand as already explained it is not possible to conduct the fermentation with high sugar concentration. In carrying out the present invention therefore we establish fermentation in a large bulk of liquid of necessarily low sugar concentration and continuously or periodically add relatively small quantities of sugar solution of relatively high sugar concentration but at such a rate that the sugar concentration in the large bulk does not rise above that at which any appreciable fermentation of non-volatile acid would take place. Corresponding with the additions of sugar solution we make withdrawals of wash.

The main product of the fermentation according to the present invention is acetic acid but this is accompanied by amounts of butyric acid varying according to the nature of the culture used and is occasionally accompanied by small quantities of propionic acid.

The manner in which the process operates in a particular set of circumstances taken by way of example can be understood more fully by consideration of the following comparative operations.

(1) 560 lbs. of beet molasses are diluted with water to a bulk of 600 gallons and fermented directly with a thermophilic cellulose-fermenting organism at the temperature usual for fermentations by such organisms, namely about 60° C.; the hydrogen ion concentration is maintained within proper limits by the usual means. After six days it will be found that the total acid produced,—calculated as acetic acid—is equal to 58% expressed as the amount of sugar converted. The amount of volatile acid produced—calculated as acetic acid—is however equal to only 28–30% expressed as the amount of sugar converted.

As compared with the poor yield of volatile acid obtained by the foregoing procedure a yield of acid which is substantially all volatile acid can be obtained by operating in accordance with the present invention as follows:—Assuming that a fermenter of say 600 gallons capacity is being used there is added to this fermenter a solution of 80 lbs. of molasses in 80 gallons of water daily for seven days. It is assumed that the fermenter has been charged with a thermophilic cellulose fermenting organism and that a temperature of about 60° C. is maintained; also it is assumed that the hydrogen ion concentration is kept at the optimum by the usual periodic additions. During the first day the total acid produced will be partly non-volatile acid owing to the concentration of the molasses as will be understood, but it will also be understood that from day to day the concentration of the molasses will diminish and in consequence the production of non-volatile acid will diminish and moreover the latter may in part serve as nutrient. Hence at the end of seven days the fermenter will be practically full of a wash very low in sugar concentration and containing also acetates and a small amount of salts of non-volatile acids. Having thus built up a wash of low sugar concentration suitable for further additions and corresponding withdrawals in accordance with the present invention there may now be withdrawn say 80 gallons of the wash per day and there may be added 80 gallons of a 10% molasses solution per day. The addition and withdrawal may of course be either at intervals or continuously. It will be understood that the hydrogen ion concentration will be kept low as before and the temperature be maintained at a suitable degree preferably about 60° C. If necessary nutrients are also added, but in the case of beet molasses no added nutrients will ordinarily be necessary.

What I claim is:—

1. In the production of volatile fatty acids by fermentation of saccharine solutions with thermophilic organisms, establishing the fermentation in a relatively large bulk of sugar solution of relatively low concentration, and making gradual addition of sugar solution of relatively high sugar concentration.

2. In the production of volatile fatty acids by fermentation of saccharine solutions with thermophilic organisms, establishing the fermentation in a sugar solution of low concentration, making gradual additions of sugar solution of relatively high concentration, making gradual corresponding withdrawal of wash and maintaining a hydrogen ion concentration suited to continuity of the fermentation.

3. In the production of volatile fatty acids by fermentation of saccharine solutions with thermophilic organisms, establishing the fermentation in a sugar solution of low concentration, making persistent additions of low bulk of sugar solution of higher concentration, making corresponding withdrawals of wash, and maintaining a hydrogen ion concentration suited to continuity of the fermentation.

4. In the production of volatile fatty acids by fermentation of sugar solutions with thermophilic organisms, establishing the fermentation in a sugar solution of about 0.5 to 1.0 per cent. strength, making gradual additions of sugar solution of relatively higher concentration, and making gradual corresponding withdrawal of wash.

5. In the production of volatile fatty acids by fermentation of sugar solutions with thermophilic organisms, establishing the fermentation in a sugar solution of about 0.5 to 1.0 per cent. strength, making persistent additions of sugar solutions of relatively higher concentration, making corresponding withdrawals of wash, and maintaining a hydrogen ion concentration suited to continuity of the fermentation.

6. In the production of volatile fatty acids by fermentation of sugar solutions with thermophilic organisms, establishing the fermentation in a relatively large bulk of sugar solution of relatively low concentration, making gradual addition of sugar solution of relatively high sugar concentration and making gradual additions of alkali to maintain the hydrogen ion concentration suited to continuity of the fermentation.

7. The production of volatile acids particularly acetic acid consisting in establishing acid-producing fermentation by an appropriate thermophilic organism at a temperature of about 60° C. in a sugar solution of low concentration, continuing the fermentation, gradually adding sugar solution of relatively high concentration, making corresponding withdrawals of wash, and making additions of alkali to keep the hydrogen ion concentration low.

8. The production of acetic acid by fermentation, consisting in establishing acetic acid producing fermentation by an appropriate thermophilic organism in a large bulk of sugar solution of low concentration, continuing the fermentation, gradually adding relatively small amounts of sugar solution of relatively high concentration and making corresponding withdrawals of wash.

9. The production of acetic acid by fermentation, consisting in establishing acetic acid producing fermentation by an appropriate thermophilic organism in a large bulk of sugar solution of about 0.5 to 1.0 per cent. strength, making gradual additions of relatively small bulk of sugar solution of relatively high concentration, and making corresponding withdrawals of wash.

10. In the production of acetic acid from saccharine liquid by fermentation with thermophilic organisms, the step of establishing the fermentation in a large bulk of the liquid of sugar concentration ranging from about 0.5 to 1.0 per cent. and adding relatively small amounts of saccharine liquid of relatively high concentration at a rate of sufficient only to maintain the aforesaid lower concentration in the total bulk of the liquid.

In testimony whereof I have signed my name to this specification.

HENRY BROUGHAM HUTCHINSON.